United States Patent
Shimizu et al.

(10) Patent No.: US 6,212,947 B1
(45) Date of Patent: Apr. 10, 2001

(54) METHOD FOR ESTIMATING A TIRE WEAR LIFE

(75) Inventors: Akiyoshi Shimizu; Naoto Yamagishi; Hiroshi Mouri; Naohiro Sasaka, all of Kodaira; Hiroshi Kobayashi, Toyota; Tetsunori Haraguchi, Toyota; Kohshi Katoh, Toyota, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/303,664

(22) Filed: May 3, 1999

(30) Foreign Application Priority Data

May 8, 1998 (JP) .................................................. 10-126178

(51) Int. Cl.$^7$ .................................................. G01N 19/02
(52) U.S. Cl. .................................................. 73/146; 73/8
(58) Field of Search .................................. 73/7, 8, 9, 146

(56) References Cited

U.S. PATENT DOCUMENTS

| | | |
|---|---|---|
| 3,769,843 | 11/1973 | Sperberg . |
| 4,779,477 * | 10/1988 | Rath ........................................... 73/9 |
| 5,247,831 * | 9/1993 | Fioravanti ............................... 73/146 |
| 5,814,718 * | 9/1998 | Andresen et al. ......................... 73/9 |
| 5,864,056 * | 1/1999 | Bell et al. ............................... 73/146 |
| 5,869,742 * | 2/1999 | Koster ....................................... 73/9 |
| 5,892,139 * | 4/1999 | Miyazaki ................................... 73/9 |
| 5,900,531 * | 5/1999 | Mani et al. ................................ 73/9 |
| 5,948,961 * | 9/1999 | Asano et al. .............................. 73/9 |

FOREIGN PATENT DOCUMENTS

| | | |
|---|---|---|
| 0 504 699 A2 | 9/1992 | (EP) . |
| B2-1-56374 | 11/1989 | (JP) . |
| 7-63658 | 3/1995 | (JP) . |

OTHER PUBLICATIONS

Kohmura, Shingo et al., "Estimation Method of Tire Treadwear on a Vehicle," SAE Technical Paper Series, 1991.
"A Trial on Laboratory Evaluation of Tire Wear," Yokohama Rubber Co., Ltd., reported in the Fall Lecture Meeting of the Japanese Automotive Engineers Society, 1982, pp. 393–396.

* cited by examiner

Primary Examiner—Eric S. McCall
(74) Attorney, Agent, or Firm—Oliff & Berridge, PLC

(57) ABSTRACT

A wear resistance index G1 of a tire whose wear life is to be estimated is measured by the Lambourn abrasion tester. Then, friction energies in free rolling, when the tire is fitted with a toe angle, under application of a side force, under application of a braking force and under application of a driving force of the tire are measured. An expected value of the wear life T1 is calculated using the wear resistance index G1 and the friction energies thus obtained and the wear life of the tire is estimated on the basis of the expected value of the wear life T1. The wear life of a tire can be estimated accurately in a short time in accordance with the method for estimating a tire wear life of the present invention.

22 Claims, 10 Drawing Sheets

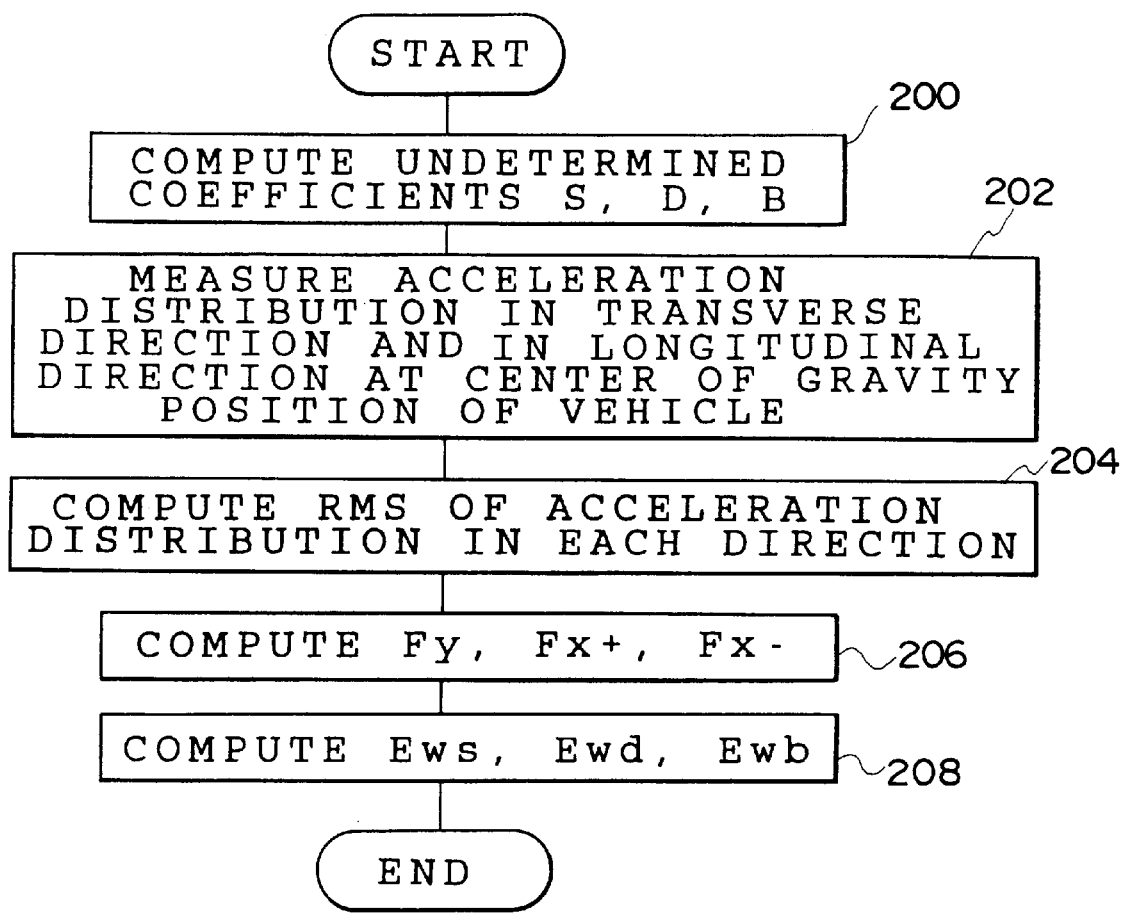

METHOD FOR ESTIMATING A TIRE WEAR LIFE

FIELD OF THE INVENTION

The present invention relates to a method for estimating a tire wear life, and more particularly, to a method for estimating a tire wear life which enables accurately estimating the tire wear life in actual use.

DESCRIPTION OF THE RELATED ART

Heretofore, the wear life of a tire used for vehicles has been estimated from the condition of wear (the degree of wear or the amount of wear) after a vehicle on which the tire whose wear life is to be estimated is mounted is actually driven for a specific distance.

However, this method has a drawback in that the test is quite time-consuming because the distance to be driven by the vehicle for the test must be great in order to get an accurate measurement of the amount of wear of the tire required for a highly precise estimation.

To overcome the above drawback, in the technology disclosed in Japanese Patent Application Publication (hereinafter, referred to as JP-B) 1-56374, at least two pairs of test tires are mounted on a vehicle used for the test and are driven on roads in a manner such that the rotation speeds of the tires are different between the pairs by a desired extent so that the wear of the tire due to the driving force and the braking force can be evaluated simultaneously.

As the method for estimating the amount of wear of a tire, a method using values obtained by a test with an actual vehicle in which both an input load applied to the tire and a dynamic alignment are taken into consideration is reported in "Estimation Method of Tire Treadwear on a Vehicle" (SAE TECHNICAL PAPER SERIES 910168).

As the formula for estimating the amount of wear of a tire, Schallamach's formula of the amount of wear has been known. In accordance with this theoretical formula, the amount of wear M of a tire per unit distance of driving is considered to be proportional to the friction energy and can be expressed by the following formula (1):

$$M = \gamma \rho F^2 / C \quad (1)$$

In formula (1), $\gamma$ represents the degree of wear of a tire, $\rho$ represents resilience, F represents an external force applied to the tire and C represents the rigidity of the tire against a force in the longitudinal direction or in the transverse direction. When the rigidity C is more specifically expressed by the rigidity in the longitudinal direction (in the direction of driving) Cd and the rigidity in the direction of braking Cb and the rigidity in the transverse direction Cs, Schallamach's formula of the amount of wear is expressed by the following formula (2):

$$M = \gamma \rho F^2 / (Cd + Cb + Cs) = \gamma \rho (Fx+^2/Cd + Fx-^2/Cb + Fy^2/Cs) \quad (2)$$

In the above formula, Fx+ represents a force in the forward direction generated by the driving force, Fx– represents a force in the backward direction generated by braking force and Fy represents an input force in the transverse direction.

However, the technology described in the specification of JP-B 1-56374 has a drawback in that at least one actual road test must be conducted for a long time and thus it still takes a long time to estimate the tire wear life, although the time required for the test can be decreased in comparison with the time required for methods of estimation using only one pair of tires in one run of the road test.

In the method reported in "Estimation Method of Tire Treadwear on a Vehicle", the amount of wear is estimated on the basis of a test using an actual vehicle and the effect of the vehicle and the effect of the tire on the amount of wear cannot be examined separately. Therefore, this method has a drawback in that the accuracy of the estimation of the amount of wear is poor when a tire is mounted on a vehicle which is different from the vehicle used in the test or when a tire is used in an area whose environment is different from the environment of the test.

In the method reported in "Estimation Method of Tire Treadwear on a Vehicle", the amount of wear of a tire is estimated by taking a force in the transverse direction, a force in the longitudinal direction, a force in the vertical direction and a camber angle into consideration. In Schallamach's formula of the amount of wear, rigidities in the direction of driving, in the direction of braking and in the transverse direction alone are taken into consideration. However, accurately estimating the wear life of a tire mounted on a vehicle in actual use is difficult when the factors taken into consideration are limited to these parameters.

When driving a vehicle in actual use, there are more diverse factors affecting the wear of a tire such as; the properties of the rubber of the tire tread portion, tire tread patterns and structures and input forces experienced by a tire in the actual use of the tire (during driving under the conditions of the actual use of the vehicle). Therefore, in the actual driving condition of a vehicle which is affected by so many diverse factors, it is obviously difficult to accurately estimate the wear of a tire using Schallamach's formula of the amount of wear in which only rigidities in the direction of driving, in the direction of braking and in the transverse direction are considered.

SUMMARY OF THE INVENTION

The present invention has been made to overcome the above problems and has an object to provide a method for estimating the tire wear life which enables accurate estimation of the tire wear life in a short time.

To achieve the above object, the method for estimating a tire wear life of the present invention has the following aspects.

In the first aspect of the present invention, a friction energy of the tire Ewf in free rolling, a friction energy of the tire Ewa in a state in which the tire is provided with a toe angle, a friction energy of the tire Ews in a state in which a side force is applied to the tire, a friction energy of the tire Ewd in a state in which a driving force is applied to the tire and a friction energy of the tire Ewb in a state in which a braking force is applied to the tire are obtained. A wear resistance index G1 of rubber of a tire tread portion is also obtained. A friction energy Ew expressed as the total of the friction energies Ewf, Ewa, Ews, Ewb and Ewd is obtained and the tire wear life is estimated on the basis of a product of the wear resistance index G1 and a reciprocal of the friction energy Ew (1/Ew), i.e., G1×(1/Ew).

In other words, the friction energy Ew is calculated as the sum of the above friction energies as follows:

$$Ew = Ewf + Ewa + Ews + Ewb + Ewd$$

An expected value TI of the tire wear life is calculated in accordance with the following formula:

$$TI = G1 \times (1/Ew) \times (NSD - 1.6)$$

In accordance with the first aspect of the present invention, the friction energy Ewf and the friction energy Ewa are used as the factors for estimating the tire wear life in addition to the friction energy Ews, the friction energy Ewd and the friction energy Ewb. Therefore, the tire wear life can be estimated more accurately in comparison with the estimation of the tire wear life in accordance with conventional methods.

In the second aspect of the present invention, the friction energy Ew is calculated by taking data of a vehicle to which the tire for the estimation is fitted into consideration. The data of the vehicle comprises: a toe angle, a camber angle and a load per one tire under a static condition of the vehicle; and changes in the toe angle, the camber angle and the load per one tire due to change in the condition of the vehicle from the static condition to a dynamic condition (or the toe angle, the camber angle and the load per one tire under the dynamic condition of the vehicle). The static condition means the condition of the vehicle while the vehicle is stopped and the dynamic condition means the condition of the vehicle while the vehicle is driven.

In accordance with the above aspect, the tire wear life can be estimated more accurately in comparison with the estimation in which the above data of the vehicle are not taken into consideration.

In the third aspect of the present invention, it is preferable that the product G1×(1/Ew) obtained as above is multiplied by a residual groove depth remaining before the groove depth reaches a limit for disposal of the tire and the tire wear life is estimated on the basis of the value of this product.

As the residual groove depth remaining before the groove depth reaches the limit for disposal of the tire, it is preferable that a value obtained by subtracting the value which is considered to be the limit for disposal of the tire, for example 1.6 (mm), from the groove depth NSD is used. The groove depth NSD of a tire may be, for example, an average value of a plurality of groove depths in a tire tread portion or the minimum value of a plurality of groove depths in a tire tread portion.

BRIEF DESCRIPTION OF THE DRAWINGS

FIG. 6 shows a schematic flow chart exhibiting the procedures for obtaining the friction energies Ews, Ewd and Ewb in the second embodiment.

DETAILED DESCRIPTION OF THE EMBODIMENTS

Figure 1:
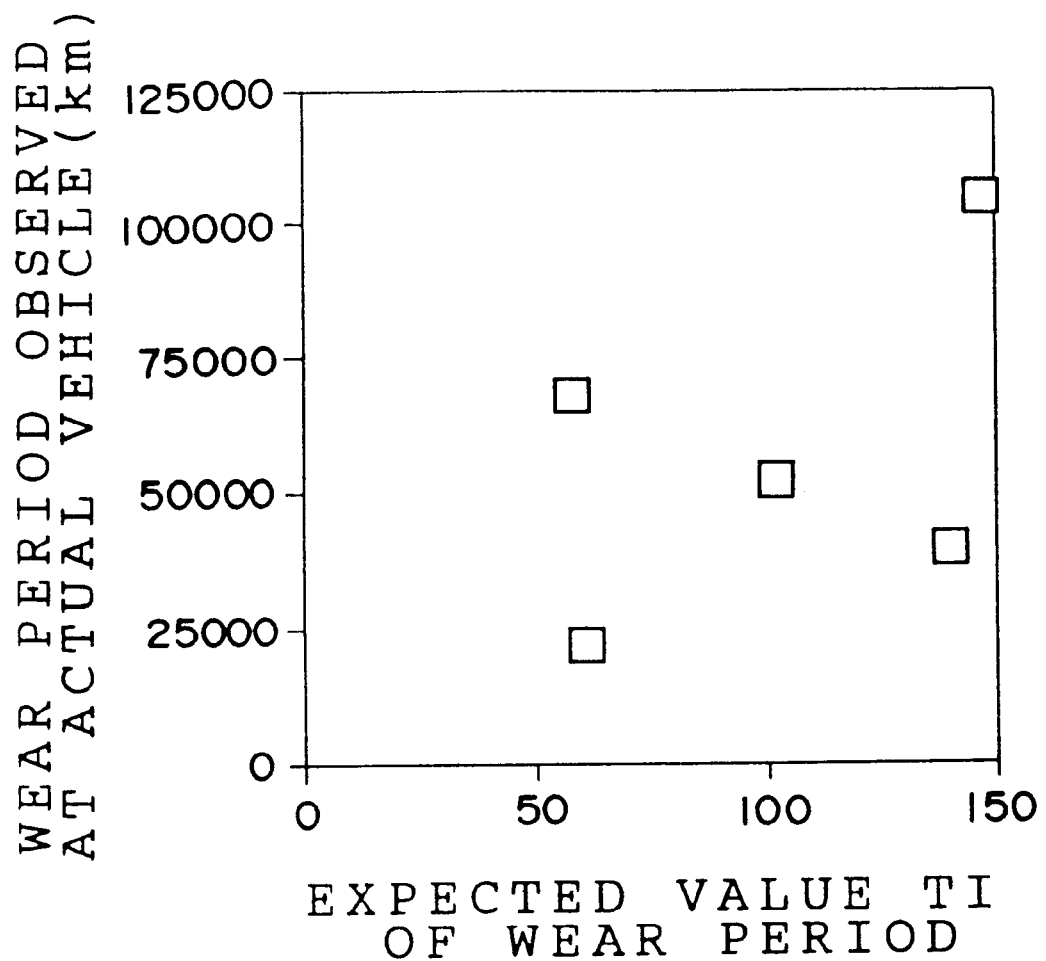
FIG. 1 shows a graph exhibiting the relation between the expected value of the tire wear life obtained in accordance with formula (5) in an embodiment described below and the tire wear life actually observed at an actual vehicle test.

The embodiments of the present invention will be described with reference to drawings in the following.

The method for estimating the tire wear life in general used in the embodiments of the present invention will be systematically described.

In the embodiments of the present invention, the term "wear life" refers to the period of time from the time the tire is new to the time the tire is worn to the extent that the properties exhibited thereby deteriorate from excellent or good to satisfactory. More concretely, "wear life" refers to the period of time from the time the tire is new to the time the groove depth of the read has shrunk to, for example, 1.6 mm.

In the method for estimating the tire wear life of the present invention, as a major characteristic of the method, a friction energy of the tire Ewf in free rolling, a friction energy of the tire Ewa in a state in which the tire is provided with a toe angle, a friction energy of the tire Ews in a state in which a side force is applied to the tire, a friction energy of the tire Ewd a driving force is applied to the tire, and a friction energy of the tire Ewb in state in which a braking force is applied to the tire are obtained.

The wear resistance index G1 of rubber of the tire tread portion is also obtained. The friction energy Ew expressed by the total of the friction energies Ewf, Ewa, Ews, Ewd and Ewb is obtained and the tire wear life is estimated on the basis of the product of the wear resistance index G1 and the reciprocal of the friction energy Ew (1/Ew), i.e., G1×(1/Ew).

The principle according to which the above values and combinations of the values can work as parameters for estimating the tire wear life in the present invention will be described in the following.

It is assumed that wear of a tire is caused by two major contributing factors: a factor G related to the rubber material of the tire tread portion and a factor E related to the tread pattern and the structure of the tire.

The wear resistance index G1 of rubber of the tire tread portion is measured by the Lambourn abrasion test and used as the factor G related to the rubber material of the tire tread portion. The friction energy is measured and used as the factor E related to the tread pattern and the structure of the tire.

It is reported in Paper No. 79 of the 131st Meeting of the American Chemical Society in 1987 and elsewhere that the wear resistance index G1 obtained in accordance with the Lambourn abrasion test is effective as the index showing the wear property of top rubber (the surface of rubber) in a tire.

It is reported in "A trial on laboratory evaluation of tire wear" by YOKOHAMA RUBBER Co., Ltd. in the preprint for the fall lecture meeting of the Japanese Automotive Engineers Society in 1982 and elsewhere that the friction energy is an effective physical factor to evaluate contribution of a tread pattern and a structure to tire wear.

Therefore, the present inventors studied estimation of the wear resistance property of a tire by using the wear resistance index G1 and the friction energy Ew of rubber.

It is considered that the greater the wear resistance index G1, the longer the tire wear life and that the greater the friction energy Ew, the shorter the tire wear life. Therefore, a wear resistance coefficient m is defined by the following formula (3):

$$m = G1/Ew \quad (3)$$

It is considered that the greater the residual groove depth of the tire, the longer the tire wear life. Accordingly, on the basis of the wear resistance coefficient m, an expected value T1 of the tire wear life is defined by the following formula (4):

$$T1 = m \times (NSD - 1.6) = (G1/Ew) \times (NSD - 1.6) \quad (4)$$

In the above formula, NSD represents a groove depth (mm) of the tire and 1.6 corresponds to the groove depth of 1.6 (mm) which is considered to be the limit groove depth for disposal of the tire.

Similarly to the Schallamach's formula, the friction energy Ew is considered to be expressed by the friction energy of the tire Ews in a state in which a side force (a force in the transverse direction) is applied to the tire, the friction energy of the tire Ewd in a state in which a driving force is applied to the tire and the friction energy of the tire Ewb in a state in which a braking force is applied to the tire. Formula (4) is modified to the following formula (5):

$$T1 = \{G1/(Ews + Ewd + Ewb)\} \times (NSD - 1.6) \quad (5)$$

In accordance with formula (5), expected values of the tire wear life T1 were calculated under application of 5 types of input forces generally found in the actual use of the tire. The (actual) wear life of the tire was also measured under the corresponding conditions by the actual vehicle test.

FIG. 1 shows a graph exhibiting the relation between the expected value of the tire wear life and the tire wear life observed at the actual vehicle test. As shown in FIG. 1, the expected value of the tire wear life T1 and the tire wear life obtained by the actual vehicle test showed a poor correlation. Therefore, it is confirmed that the accuracy of estimation of the tire wear life cannot be improved without modifying the expected value of the tire wear life described above.

Figure 2C:
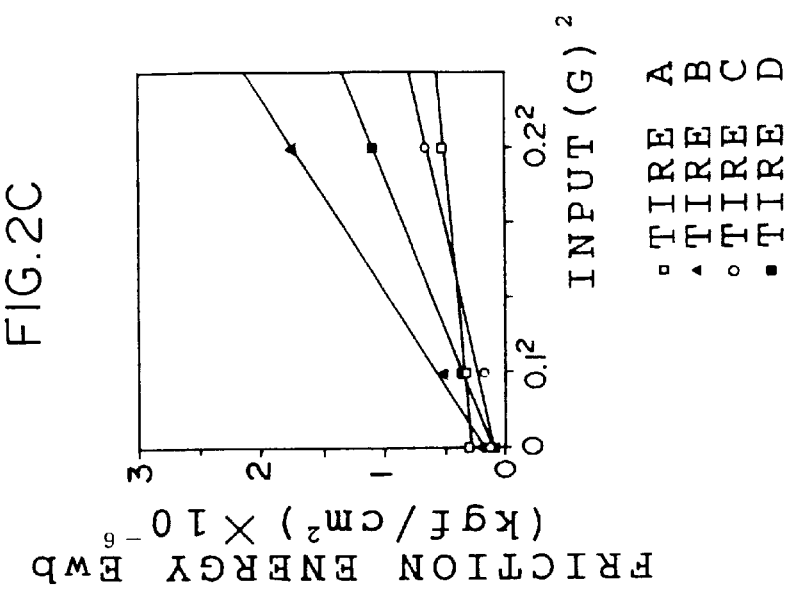
FIG. 2C shows a graph exhibiting the relation between the square of an input force and the friction energy Ewb of a tire under application of a braking force.
Figure 2B:
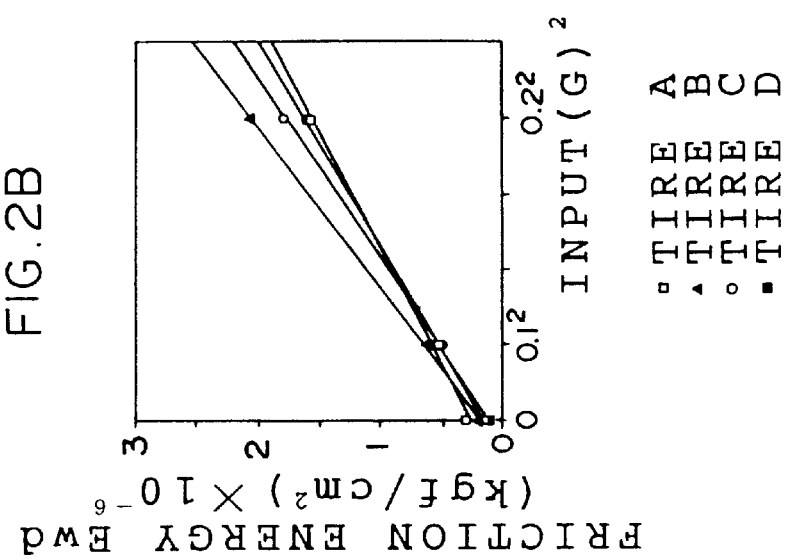
FIG. 2B shows a graph exhibiting the relation between the square of an input force and the friction energy Ewd of a tire under application of a driving force.
Figure 2A:
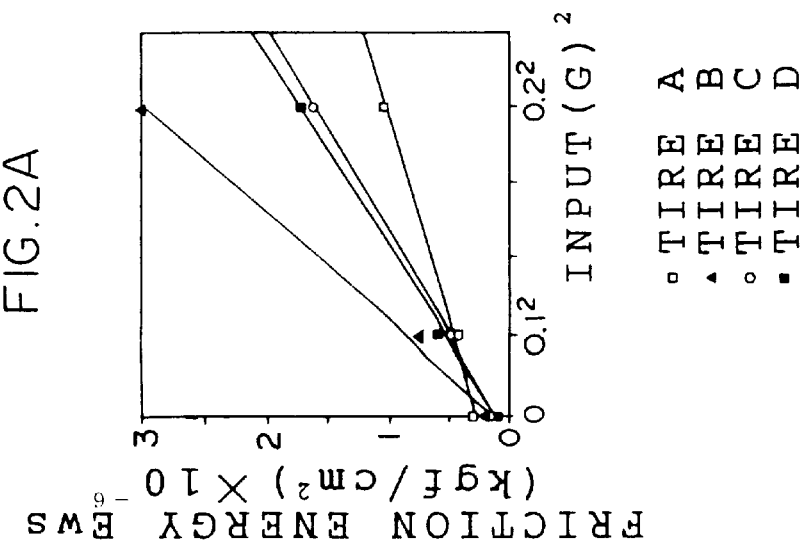
FIG. 2A shows a graph exhibiting the relation between the square of an input force and the friction energy Ews of a tire under application of a side force.

The friction energies were studied in detail to elucidate the cause of the poor correlation obtained above. As the result, it was found that, with four types of tires A to D, the friction energies Ews, Ewd and Ewb were proportional to the square of the respective input forces as shown in FIGS. 2A to 2C. This result agrees with the Schallamach's formula.

However, lines in the graphs did not pass through the origin and gave respective positive intercepts.

The positive intercepts were studied in detail and, as the result, it was found that the friction energy of the tire Ewf in free rolling (when the tire was allowed to roll freely) and the friction energy of the tire Ewa in a state in which the tire was provided with a toe angle were major factors contributing to the friction energy corresponding to the above positive intercept.

On the basis of the above findings, the friction energy Ew is calculated in accordance with the following formula (6):

$$Ew = Ewf + Ewa + Ews + Ewb + Ewd \quad (6)$$

and the expected value T1 of the tire wear life of a tire is calculated in accordance with the following formula (7):

$$T1 = G1 \times (1/Ew) \times (NSD) - 1.6) \quad (7)$$

Figure 3:
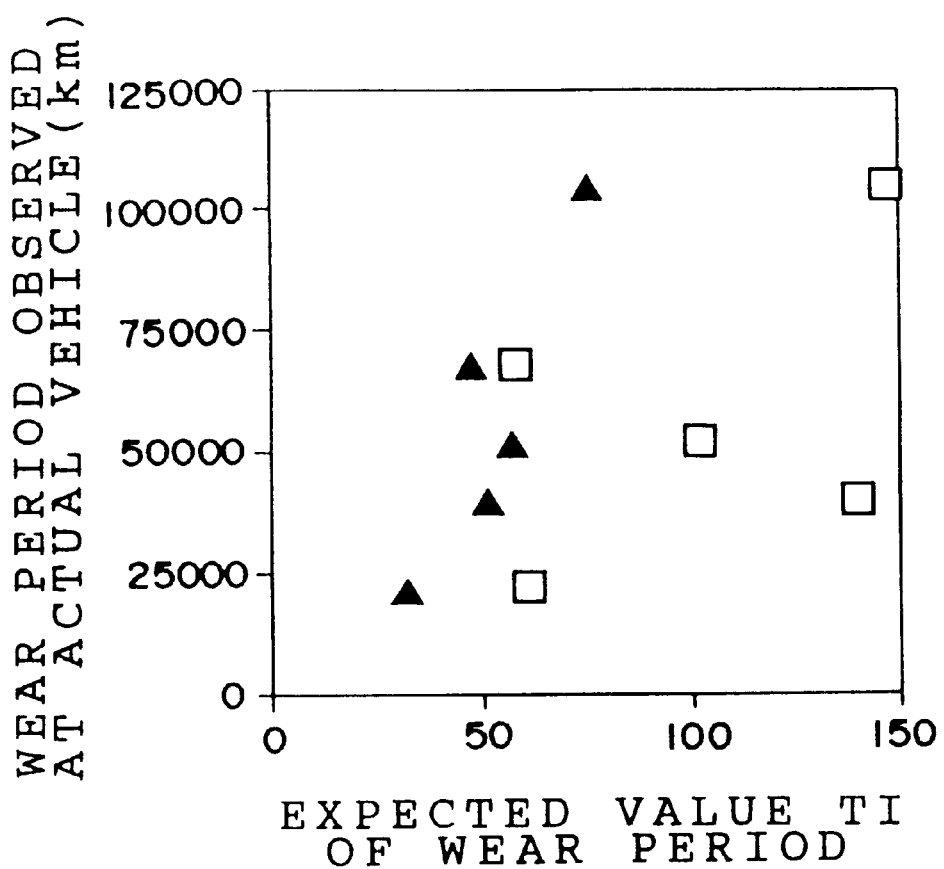
FIG. 3 shows a graph exhibiting the relation between the expected value of the tire wear life obtained in accordance with formula (7) and the tire wear life actually observed by an actual vehicle test.

In accordance with formula (7), expected values T1 of the tire wear life of tires were calculated under application of 5 types of input forces in the same manner as that conducted above in accordance with formula (5). As the result, it was found that the correlation between the expected value of the tire wear life T1 and the tire wear life actually observed at the actual vehicle test was improved as shown in FIG. 3. Thus, it was found that the accuracy of estimation of tire wear life based on the expected value of the tire wear life T1 described above is significantly improved.

On the basis of the above principle, in the method for estimating the tire wear life of the present invention, the friction energy of the tire Ewf in free rolling, the friction energy of the tire Ewa in a state in which the tire is imparted with a toe angle, the friction energy of the tire Ews in a state in which a side force is applied to the tire, the friction energy of the tire Ewd in a state in which a driving force is applied to the tire and the friction energy of the tire Ewb in a state in which a braking force is applied to the tire are obtained. The wear resistance index G1 of rubber of a tire tread portion is also obtained.

The wear resistance index G1 can be obtained by a laboratory test of wear such as the Lambourn abrasion test. The Lambourn abrasion test is specified in Japanese Industrial Standard K 6264. This method is one of various test methods for measuring wear of vulcanized rubbers and other elastomers and is a test method of measuring wear resistance by using the Lambourn abrasion tester. The toe angle is the angle between the direction of driving and the equatorial plane of the tire. The side force is the force in the direction perpendicular to the rolling direction of the tire. The driving force is the force in the moving direction of the tire generated when driving the tire. The braking force is the force generated by braking in the direction opposite to the driving force. The friction energies are energies per units area and expressed by the units of kgf/cm (N/m in the case of the SI unit).

The tire wear life is estimated on the basis of the product of the above wear resistance index G1 and the reciprocal of the friction energy Ew expressed by formula (6) (1/Ew), i.e., G1×(1/Ew).

As described above in detail, in accordance with the present invention, the friction energy of the tire Ewf in a state of free rolling and the friction energy of the tire Ewa in a state in which the tire is imparted a toe angle are used as the factors for estimating the tire wear life in addition to the friction energies of the tire Ews, Ewd and Ewb. Therefore, the tire wear life can be estimated more accurately in comparison with the conventional method for estimating tire wear life.

In the method for estimating the tire wear life of the present invention, the friction energy Ew is calculated by taking data of a vehicle to which the tire whose wear life is to be estimated is fitted into consideration. The data of the vehicle comprises: the toe angle, the camber angle and the load per one tire under the static condition of the vehicle; and changes in the toe angle, the camber angle and the load per one tire due to change in the condition of the vehicle from the static condition to the dynamic condition or the toe angle, the camber angle and the load per one tire under the dynamic condition of the vehicle. The static condition means the condition of the vehicle in stopping and the dynamic condition means the condition of the vehicle in driving.

As described above, in accordance with the present invention, the friction energy Ew is calculated by taking data of a vehicle to which the tire whose wear life is to be estimated is fitted into consideration, wherein the data of the vehicle comprises: the toe angle, the camber angle and the load per one tire under the static condition of the vehicle; and changes in the toe angle, the camber angle and the load per one tire due to change in the condition of the vehicle from the static condition to the dynamic condition (or the toe angle, the camber angle and the load per one tire under the dynamic condition of the vehicle). Therefore, the tire wear life can be estimated more accurately in comparison with estimation without taking these vehicle data into consideration.

In the present invention, it is preferable that the tire wear life is estimated on the basis of a value obtained by multiplying the product $G1\times(1/Ew)$ by a residual groove depth remaining before the groove depth reaches a limit for disposal of the tire.

As the residual groove depth remaining before the groove depth reaches the limit for disposal of the tire, it is preferable that a value obtained by subtracting the value which is considered to be the limit for disposal of the tire, for example 1.6 (mm), from the groove depth NSD is used. The groove depth NSD of a tire may be, for example, an average value of a plurality of groove depths in a tire tread portion or the minimum value of a plurality of groove depths in a tire tread portion.

[The First Embodiment]

Figure 4:
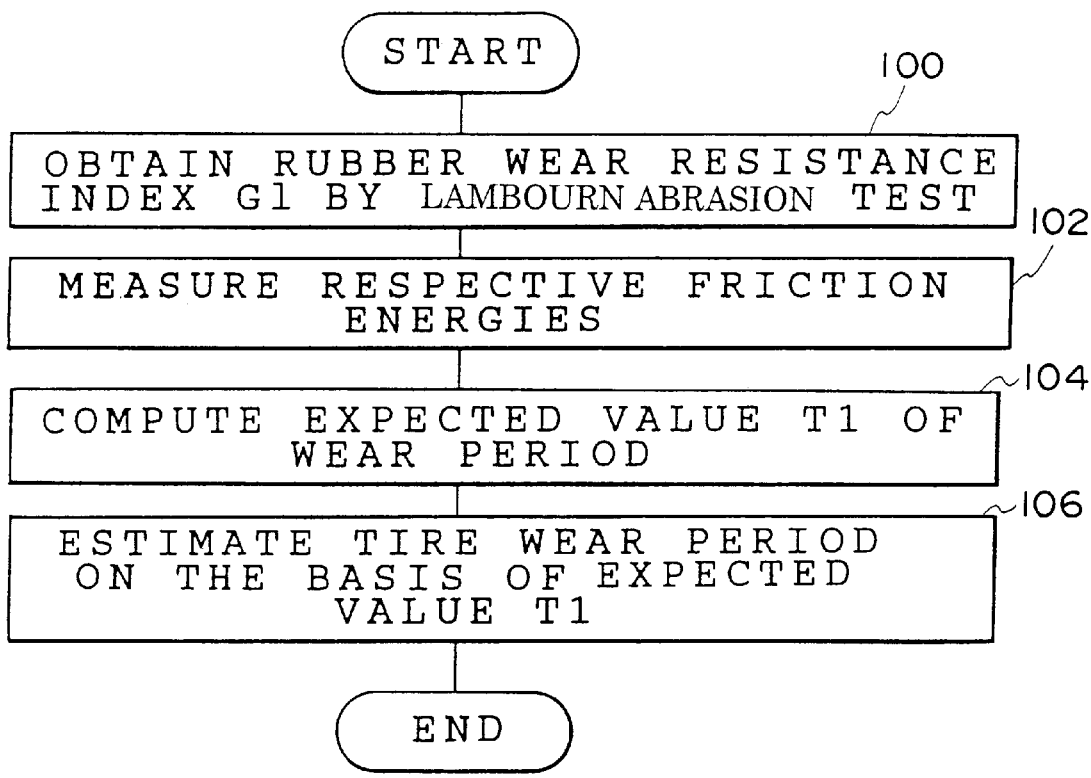
FIG. 4 shows a schematic flow chart exhibiting the procedures for estimation of the tire wear life in the first embodiment.

The first embodiment of the method for estimating a tire wear life of the present invention will be described with reference to the flow chart shown in FIG. 4.

In step 100, the wear resistance index G1 of a rubber sample which is made of the same material as the material used in the tire tread portion of a tire whose wear life is to be estimated (for example, a tire having a size 225/55R16) is obtained at a standard temperature of the atmosphere (for example, 25° C.) in accordance with the Lambourn abrasion test specified in Japanese Industrial Standard K 6264.

In the next step 102, the friction energy of the tire Ewf in free rolling, the friction energy of the tire Ewa in a state in which the tire is imparted with a toe angle, the friction energy of the tire Ews in a state in which a side force is applied to the tire, the friction energy of the tire Ewd in a state in which a driving force is applied to the tire and the friction energy of the tire Ewb in a state in which a braking force is applied to the tire are measured.

The measurement of the friction energies can be conducted by using, for example, an apparatus 10 for measuring the parameter values required for computation of the friction energies generated at the road-contacting portion of a tire tread shown in FIG. 5 which is described in the specification of Japanese Patent Application Laid-Open No. (abbreviated as JP-A, hereinafter) 7-63658.

Using the apparatus 10, the amount of slip S (cm) is measured in free rolling state, in a state in which the tire is imparted with a toe angle, in a state in which a side force is applied to the tire, in a state in which a driving force is applied to the tire and in a state in which a braking force is applied to the tire. At the same time, the shearing force τ (kgf/cm²) is measured by using a converter of three force components 32 disposed on the road surface 22. As described in the specification of JP-A 7-63658, the amount of work of friction E at the road-contacting surface of a tire is expressed by the following formula (8):

$$E=\int\tau ds \qquad (8)$$

Accordingly, the amount of work of friction at the road-contacting surface of the tire is calculated by using the amount of slip S and the shearing force τ obtained by the measurement using the apparatus 10 in formula (8) and the obtained value is used as the friction energy.

In the measurement of the friction energy Ewa, the toe angle can be provided by attaching a tire 30 to an upper portion of the tire support 54 in a manner such that the angle portion of the equitorial plane of the attached tire 30 with respect to the direction of movement is set at the desired toe angle. The side force is applied by moving the tire support 54 rightward or leftward with respect to the direction of movement of the road surface 22 while the road surface 22 is moved or by setting an angle between the direction of the movement of the road surface 22 and the face of the wheel.

The method for measurement of the amount of slip S and the shearing force τ of the road-contacting portion of a tire tread using the apparatus 10 will be described in detail in the following.

When the amount of slip S at a particular position (for example, a block) in the road-contacting portion is to be measured, the particular portion on the tire tread is marked. The tire 30 is rotated so as to place the marked block at the upper central position of the tire. The position of the tire support 54 is adjusted so that the marked portion is brought directly below a television camera 60. The road surface 22 is moved so that the central portion of a transparent plate 24 is brought at the position directly above the marked portion. A subframe 36 is raised to press the tire tread against the transparent plate 24 of the road surface 22. To determine the pressure of the tire 30, the road surface 22 is moved so that the tire 30 is brought into contact with a converter of three force components 32, and the measurement and the adjustment are made.

The road surface 22 is brought to one side of a horizontal frame 18 in the longitudinal direction. Then, the road surface 22 is moved to the other side of the horizontal frame 18 in the longitudinal direction at a given speed, for example, at the circumferential speed of the tire.

By the above procedure, any particular (given) portion in the tire tread can be observed at the center of the finder area of the television camera 60 from the time when the particular portion is brought into contact with the transparent plate 24 through the time when the particular portion leaves the transparent plate 24.

In the apparatus 10, the television camera 60 is fixed to the road surface 22. Therefore, when the particular portion contacting the transparent plate 24 of the road surface 22 does not slip, the marked portion is observed in a static state at the center of the television monitor.

When the desired portion contacting the transparent plate 24 does slip, the position of the selected portion shows a shift relative to the transparent plate 24. Therefore, the marked portion observed in the television monitor moves from the central position of the monitor. The amount of the movement is measured to obtain the amount of slip S.

Using the apparatus 10, the condition of the particular portion of the tire tread can be easily monitored from the time when the desired portion is brought into contact with the transparent plate 24 of the road surface 22 through the time when the desired portion leaves the transparent plate 24.

In the apparatus 10, it is not necessary for the image of the entire road-contacting surface to be recorded. The entire finder area of the television camera 60 can thus be used for recording the image of a small region to be measured (for example, the entire finder area of the television camera 60 can be used for analyzing one block of the tread) so that the amount of slip S can be measured more accurately.

The shearing force τ applied to the road-contacting surface is measured by using the converter of three force components 32 disposed on the road surface 22.

After the friction energies are measured as described above, in step 104 shown in FIG. 4, the expected value T1 of the wear life of the tire can be calculated by using the wear resistance index G1 measured in step 100, the friction energies measured in step 102 and the groove depth NSD of the tire in formula (7).

In the first embodiment, the groove depth NSD of the tire is measured in advance as the average value of the values of the groove depth measured at a plurality of positions of the tire tread portion.

In the next step 106, the tire wear life is estimated on the basis of the expected value T1 of the tire wear life calculated in step 104. The estimation of the tire wear life can be made in various ways. For example, the expected tire wear life T1 obtained above may be is compared with expected wear life T1 of other tires and estimated as longer or shorter than the wear life of the other tires. As another example, a graph shown in FIG. 3 is prepared in advance with respect to the tire to be examined and then the wear life of the object tire can be obtained on the basis of the graph and the obtained expected value of the tire wear life T1.

As described above in detail, in accordance with the method for estimating the tire wear life of the first embodiment, the friction energy of the tire Ewf in free rolling and the friction energy of the tire Ewa when the tire is imparted with a toe angle are used as the factors for estimating the tire wear life in addition to the friction energy Ews, the friction energy Ews and the friction energy Ewb. Therefore, the tire wear life can be estimated more accurately in comparison with estimation in accordance with conventional method of estimating the tire wear life.

Figure 5:
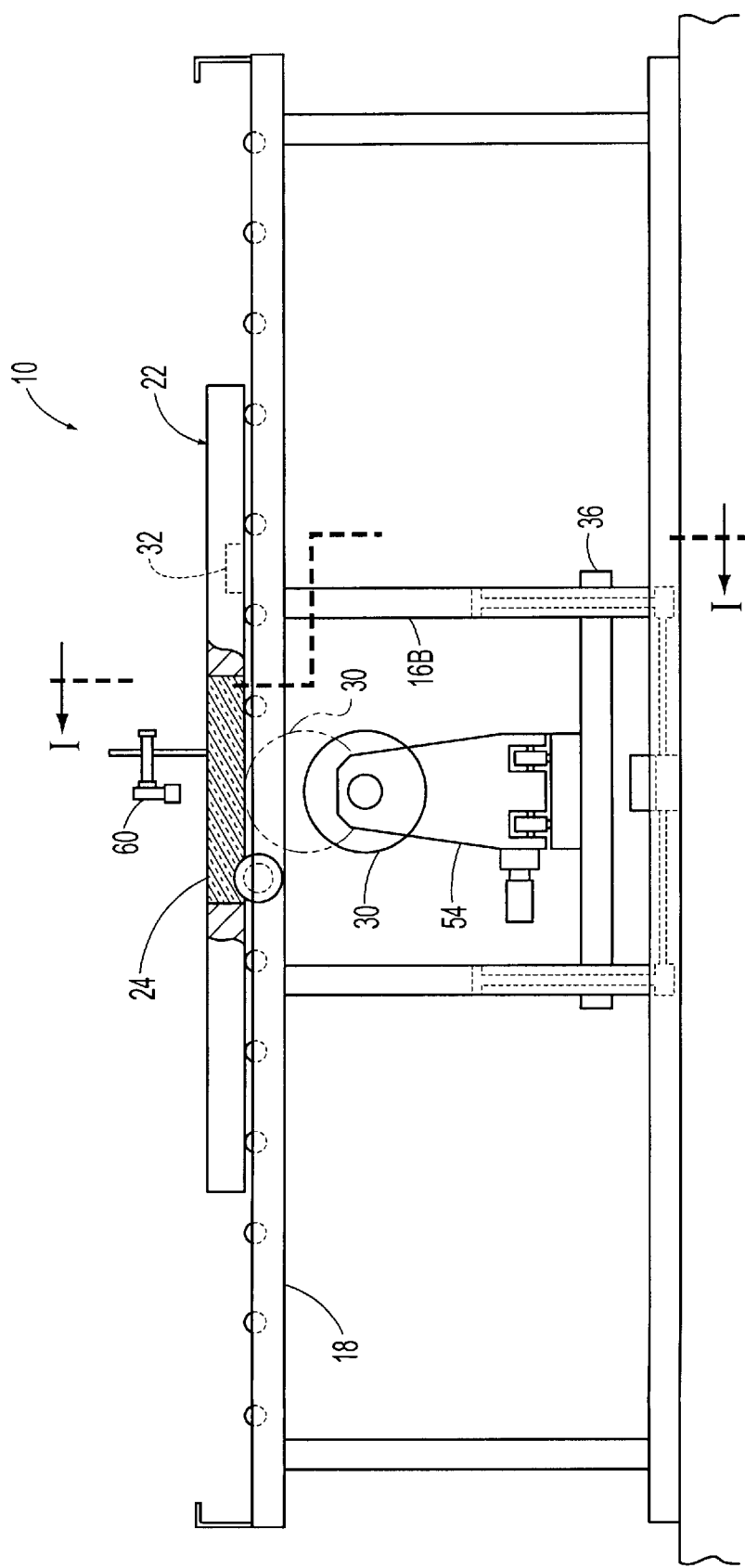
FIG. 5 shows a side view of an apparatus for measuring parameter values required for computation of the friction energies generated at a road-contacting portion of a tire tread used for obtaining friction energies in the first embodiment of the present invention.

In the method for estimating a tire wear life of the present embodiment, the tire wear life can be estimated by only the Lambourn abrasion test and the measurements of the friction energies using the apparatus for measuring the parameter values required for computing the friction energies generated at the road-contacting portion shown in FIG. 5, and no driving tests using vehicles are necessary. Therefore, the estimation can be carried out in a short time.

[The Second Embodiment]

The second embodiment of the present invention will be described in the following. The present embodiment is different from the first embodiment described above in that the friction energy of the tire Ews under application of a side force, the friction energy of the tire Ewd under application of a driving force and the friction energy of the tire Ewb under application of the braking force, which are measured by using the apparatus 10 shown in FIG. 5 in the first embodiment, are obtained as data reflecting input forces in the actual use of the tire in the present embodiment.

The method for obtaining the friction energy of the tire Ews under application of a side force, the friction energy of the tire Ewd under application of a driving force and the friction energy of the tire Ewb under application of the braking force in the present embodiment will be described with reference to the flow chart shown in FIG. 6.

In step 200, using an input force in a transverse direction Fy, a force in a forward direction Fx+ generated by the driving force, a force in a backward direction Fx− generated by the braking force, undetermined coefficients S, D and B and exponents ns, nd and nb, the friction energy Ews, the friction energy Ewd and the friction energy Ewb are expressed by the following formulae (9) to (11):

$$Ews = S \times Fy^{ns} \quad (9)$$

$$Ewd = D \times Fx+^{nd} \quad (10)$$

$$Ewb = B \times FX-^{nb} \quad (11)$$

In the above formulae, the input force in the transverse direction Fy, the force in the forward direction Fx+ and the force in the backward direction Fx− are expressed by the units of kgf. In the present embodiment, the exponents ns, nd and nb are set at the fixed value of 2 for convenience.

In the above formulae, the undetermined coefficients S, D and B can be obtained, for example, in accordance with the following method. To obtain the undetermined coefficient S, the friction energy Ews is measured a plurality of times (at least three times, preferably) by each time applying a given value of the input force in the transverse direction Fy to the tire whose wear life is to be estimated. Using the measured values of the friction energy Ews and the squares of the corresponding input forces in the transverse direction Fy, a plurality of determined values of the coefficient S are obtained by reverse calculation in accordance with formula (9), i.e., by calculation of $Ews/Fy^2$. The plurality of values of S thus obtained are averaged to obtain the value of the coefficient S used for the calculation.

Similarly, to obtain the undetermined coefficient D, the friction energy Ewd is measured a plurality of times (at least three times, preferably) by each time applying a given value of the input force in the forward direction Fx+ to the tire whose wear life is to be estimated. Using the measured values of the friction energy Ewd and the squares of the corresponding input forces in the forward direction Fx+, a plurality of determined values of the coefficient D are obtained by reverse calculation in accordance with formula (10), i.e., by calculation of $Ews/Fx+^2$. The plurality of values of D thus obtained are averaged to obtain the value of the coefficient D used for the calculation.

Similarly, to obtain the undetermined coefficient B, the friction energy Ewb is measured a plurality of times (at least three times, preferably) by each time applying a given value of the input forces in the backward direction Fx− to the tire whose wear life is to be estimated. Using the measured values of the friction energy Ewb and the squares of the corresponding input forces in the backward direction Fx−, a plurality of determined values of the coefficient B are obtained by reverse calculation in accordance with formula (11), i.e., by calculation of $Ewb/Fx-^2$. The plurality of values of B thus obtained are averaged to obtain the value of the coefficient B used for the calculation.

In the next step 202, roads which represent the conditions of the actual use of the tire in the estimation of the wear life (for example, generally used roads in Japan) are specified. A vehicle is driven on the specified roads for a given distance and the acceleration (G) in the transverse direction at the center of gravity position of the vehicle and the acceleration (G) in the longitudinal direction at the center of gravity position of the vehicle are measured at a given time interval to obtain the distribution of acceleration in the transverse direction at the center of gravity position of the vehicle and the distribution of acceleration in the longitudinal direction at the center of gravity position of the vehicle.

Figure 7A:
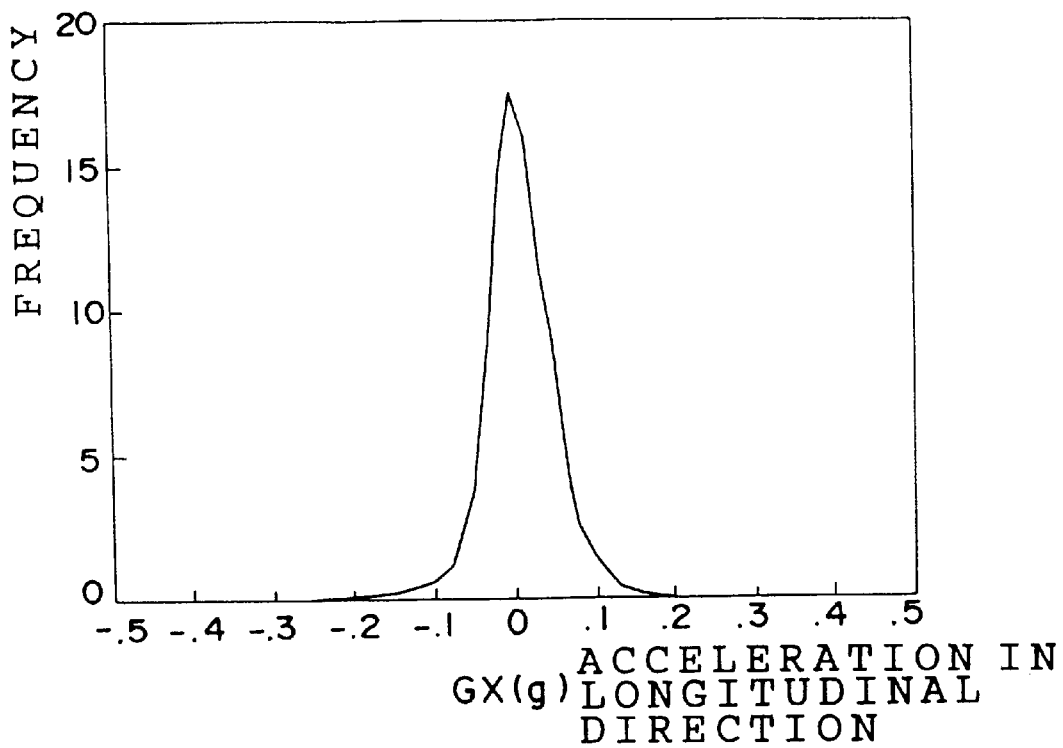
FIG. 7A shows a graph exhibiting an example of the distribution of acceleration in the longitudinal direction at the center of gravity position of a vehicle in actual use.
Figure 7B:
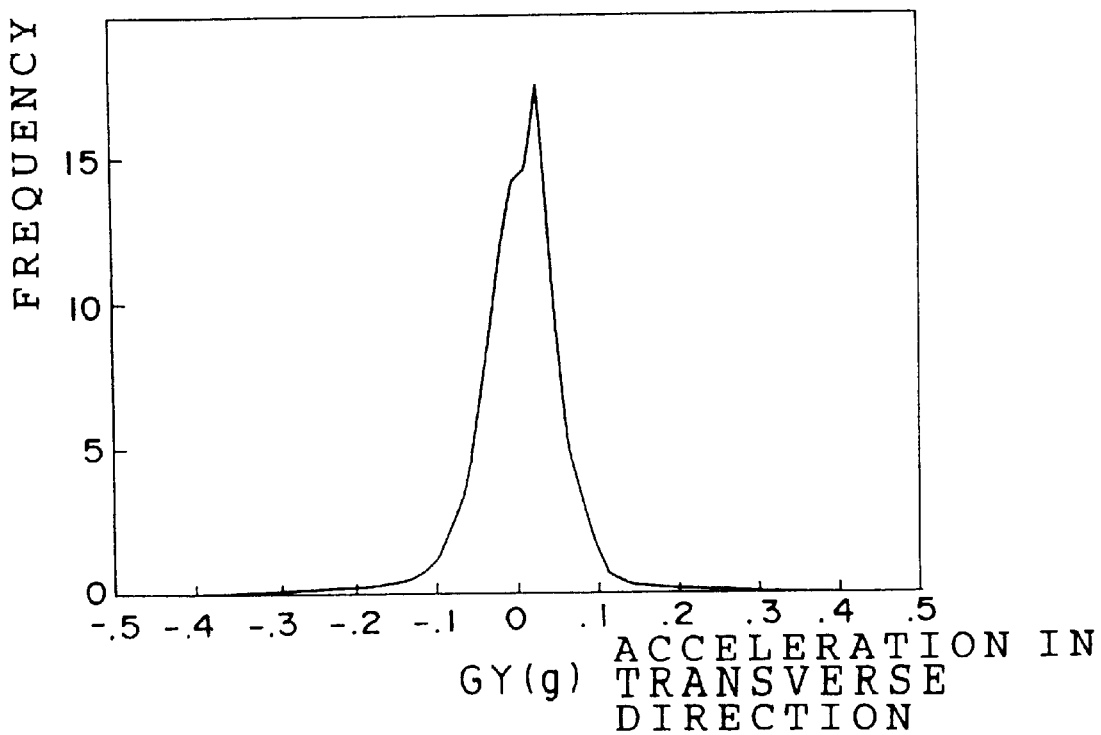
FIG. 7B shows a graph exhibiting an example of the distribution of acceleration in the transverse direction at the center of gravity position of a vehicle in actual use.

These accelerations can be measured, for example, by a G sensor disposed at the center of gravity position of the vehicle. An example of the distribution of the acceleration in the longitudinal direction at the center of gravity position of a vehicle is shown in FIG. 7A and an example of the distribution of the acceleration in the transverse direction at the center of gravity position of a vehicle is shown in FIG. 7B.

In the next step 204, the RMS value of the distribution of acceleration in the transverse direction (As), the RMS value Ax+ of the distribution of acceleration in the forward direction and the RMS value Ax− of the distribution of acceleration in the backward direction are calculated. The RMS value is a value obtained as the square root of the average of the square of values in a given range of the distribution of acceleration.

To obtain the RMS value Ax+ of the distribution of acceleration in the forward direction, the values of acceleration greater than 0 in the distribution of acceleration in the longitudinal direction at the center of gravity position of the vehicle are used. To obtain the RMS value Ax− of the distribution of acceleration in the backward direction, the values of acceleration smaller than 0 in the distribution of acceleration in the longitudinal direction at the center of gravity position of the vehicle are used.

In the next step 206, the input force in the transverse direction Fy, the input force in the forward direction Fx+ and the input force in the backward direction Fx− are obtained from the RMS value As, the RMS value Ax+ and the RMS value Ax− obtained above and the load applied to the tire w in accordance with the following formulae (12) to (14):

$$Fy = w \times As \quad (12)$$

$$Fx+ = w \times Ax+ \quad (13)$$

$$Fx- = w \times Ax- \quad (14)$$

wherein the load applied to the tire w is expressed by the unit of kg.

In the calculation of the force in the forward direction Fx+ for a vehicle having only two driving wheels, the sum of forces generated by the two driving wheels is made equal to the force of inertia at the center of gravity position of the vehicle because the force for accelerating the entire vehicle must be formed by the two driving wheels alone.

In the next step 208, the friction energy Ews is obtained by using the coefficient S and the input force in the transverse direction Fy which have been obtained in formula (9). The friction energy Ewd is obtained by using the coefficient D and the force in the forward direction Fx+ which have been obtained in formula (10). The friction energy Ewb is obtained by using the coefficient B and the force in the backward direction Fx− which have been obtained in formula (11).

When the values of Fy, Fx+ and Fx− to be obtained in step 206 are known in advance, it is possible that step 200 is not conducted and the friction energies Ews, Ewd and Ewb are directly obtained in step 208 by the measurement using the apparatus 10 or a similar apparatus under the condition of the known values of Fy, Fx+ and Fx−.

As described in detail in the above, in the method for estimating a tire wear life of the present embodiment, the friction energy Ews, the friction energy Ewd and the friction energy Ewb are obtained on the basis of the RMS values of the distribution of acceleration in the transverse direction at the center of gravity position of a vehicle and the distribution of acceleration in the longitudinal direction at the center of gravity position of the vehicle in the actual use of the vehicle, so that the friction energies reflect the input forces in the actual use of the vehicle. Therefore, the tire wear life can be estimated more accurately in comparison with the estimation in accordance with the method of estimation described in the first embodiment.

In the above description of the present embodiment, the exponents ns, nd and nb are fixed at the value of 2 and the friction energies are measured a plurality of times by applying each time a given value of the input force. Then, determined values of coefficients S, D and B are obtained from the corresponding input forces and the friction energies by the reversed use of formulae (9) to (11).

However, the present invention is not limited to this case. In another example, the friction energies may be measured a plurality of times by applying each time a given value of the input force without fixing the exponents ns, nd and nb to any particular values. In this case, approximate values of the undetermined coefficients S, D and B and exponents ns, nd and nb can be obtained from the relation between the input forces and the friction energies in accordance with the least square method or the deviation area method. The tire wear life can be estimated more accurately in accordance with the latter method in comparison with the method in which the exponents ns, nd and nb are set at a fixed value.

[The Third Embodiment]

The third embodiment of the present invention is described in the following. In the present embodiment, the toe angle, the camber angle and the load per one tire in the static and dynamic conditions of the vehicle to which the tire to be estimated is fitted are taken into consideration and this the friction energy Ew reflecting input forces in the actual use of the vehicle is calculated, allowing more accurate estimation of the tire wear life.

Figure 8:
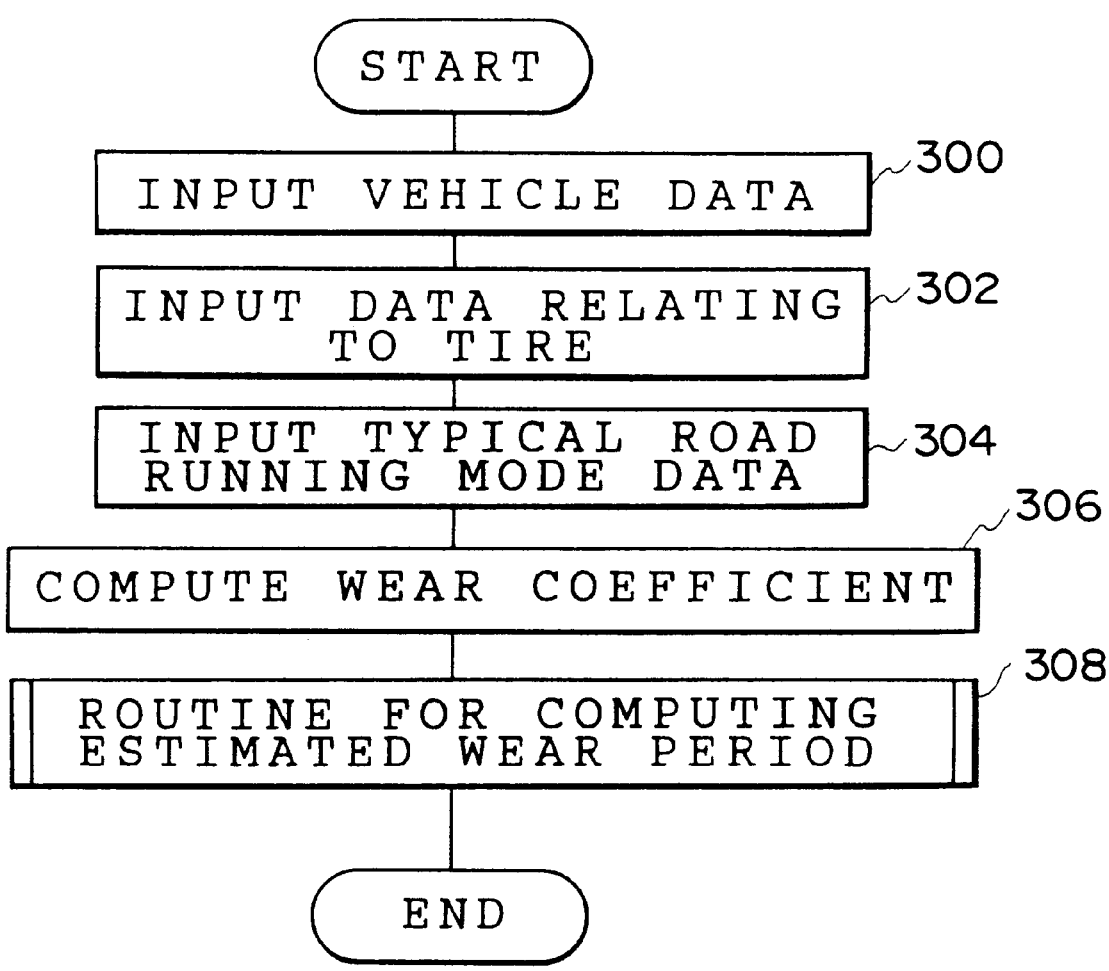
FIG. 8 shows a schematic flow chart exhibiting the procedures for estimation of the tire wear life in the third embodiment.

The method for estimating a tire wear life of the present embodiment will be described with reference to the flow charts shown in FIG. 8 and FIG. 9A in the following.

In step 300, data of the vehicle to which the tire whose wear life is to be estimated is fitted, are input. Such data include static properties (the toe angle, the camber angle and the load per one tire under the static condition) and dynamic properties (the toe angle, the camber angle and the load per one tire under the dynamic condition).

It should be noted that the changes between "a toe angle, a camber angle and a load per one tire under a static condition of the vehicle" and "the toe angle, the camber angle and the load per one tire under a dynamic condition of the same vehicle" are used as the respective changes in the toe angle, the camber angle and the load per one tire due to the condition of the vehicle changing from a static condition to a dynamic condition. In addition, such respective changes in the toe angle, the camber angle and the load per one tire due to the condition of the vehicle changing from a static condition to a dynamic condition can be used in place of "the toe angle, the camber angle and the load per one tire under a dynamic condition of the vehicle" at the time when the friction energy Ew is computed.

In the next step 302, data relating to the tire itself are input. The data relating to the tire itself include: the wear resistance index G1 of a rubber sample made of the same material as the rubber in the tire tread portion of the tire whose wear life is to be estimated at a standard temperature of the atmosphere (for example, 25° C.); the effective groove depth Z; and various parameters relating to the tire in a free rolling state, in a side force applying state, in a braking force applying state and in a driving force applying state, which are described in the following.

(Parameters in free rolling)

A friction energy of the tire in free rolling ef

A friction energy of the tire in free rolling when the tire is imparted with an initial toe angle eaf A friction energy of the tire per camber angle in free rolling Kf (Parameters under application of a side force)

A friction energy of the tire under application of the side force es

A change in the friction energy of the tire under application of the side force which is obtained by taking into consideration the change in the cornering power (hereinafter referred to as Cp) due to roll steer and due to the change in the load, the change in the toe angle due to the change in Cp and the change in the camber under application of the side force due to the change in Cp eas.

A change in a friction energy of the tire per camber angle under application of the side force Ks (Parameters under application of a braking force)

A friction energy of the tire under application of the braking force eb

A change in the friction energy of the tire under application of the braking force which is obtained by taking into consideration the change in Cp due to the street by the force in the longitudinal direction and due to the change in the load and the change in the toe angle due to the change in Cp eab.

A change in a friction energy of the tire per camber angle under application of the braking force Kb (Parameters under application of a driving force)

A friction energy of the tire under application of the driving force ed

A change in the friction energy of the tire under application of the driving force which is obtained by taking into consideration the change in Cp due to the steer by the force in the longitudinal direction and due to the change in the load and the change in the toe angle due to the change in Cp ead.

A change in a friction energy of the tire per camber angle under application of the driving force Kd The wear resistance index G1 to be input in the present step 302 can be obtained by a laboratory wear test such as the Lambourn abrasion test described above. The other parameters can be obtained by the apparatus 10 shown above in FIG. 5 or other like apparatuses. The effective groove depth corresponds to the residual grooved depth remaining before the groove depth reaches the limit groove depth for disposal of the tire.

In the next step 304, the distribution of acceleration in the transverse direction at the center of gravity position of the vehicle in actual use and the distribution of acceleration in the longitudinal direction at the center of gravity position of the vehicle of the vehicle in actual use, which have similar shapes to those shown in FIG. 7B and FIG. 7A, are input. The distribution of accelerations can be obtained by the same method as that shown above in the second embodiment.

In the next step 306, on the basis of the data which have been input in steps 300 to 304, the friction energy Ew as the total friction energy is calculated in accordance with formula (15):

$$Ew = \sum_{i=1}^{n} (Ewfi + Ewsi + Ewbi + Ewdi) \tag{15}$$

The wear coefficient MK is then calculated by using the calculated friction energy Ew, the wear resistance index G1 and the effective groove depth Z in the following formula (16):

$$MK = G1/Ew \times Z \tag{16}$$

In formula (15), n represents a number of values of acceleration G taken as samples to obtain the distribution of acceleration in the actual use of the vehicle (refer to FIG. 7), Ewfi represents the friction energy of the tire in free rolling obtained in accordance with the following formula (17), Ewsi represents the friction energy of the tire in a state in which a side force is applied thereto obtained in accordance with the following formula (18), Ewbi represents the friction energy of the tire in a state in which a braking force is applied thereto obtained in accordance with the following formula (19) and Ewdi represents the friction energy of the tire in a state in which a driving force is applied thereto obtained in accordance with the following formula (20):

$$Ewfi = \{(ef + eaf) \times CA \times Kf\} \times \text{frequency } i \tag{17}$$

$$Ewsi = \{(es + eas) \times CA \times Ks\} \times \text{frequency } i \tag{18}$$

$$Ewbi = \{(eb + eab) \times CA \times Kb\} \times \text{frequency } i \tag{19}$$

$$Ewdi = \{(ed + ead) \times CA \times Kd\} \times \text{frequency } i \tag{20}$$

In formulae (17) to (20), the frequency i represents the fraction of the frequency of the i-th acceleration in the entire frequencies in the distribution of acceleration in the actual use of the vehicle. For example, when the entire frequency is 100 and the frequency of the i-th acceleration is 5, frequency i represents 0.05 (5/100). CA in formulae (17) to (20) represents the initial value of the static camber angle.

In the present step 306, the undetermined coefficients S, D and B and the exponents ns, nd and nb each may be set or obtained so that the friction energies Ewsi, Ewdi and Ewbi can be obtained in accordance with formulae (9) to (11) in the same manner as that conducted in the second embodiment.

To obtain the values of the undetermined coefficients S, D and B and the exponents ns, nd and nb, the friction energies are measured a plurality of times by applying each time a given value of the input force and then approximate values may be obtained from the relation between the input forces and the friction energies in accordance with the least square method or the deviation area method.

In the next step 308, the routine for computing the value of estimation is carried out.

Figure 9A:
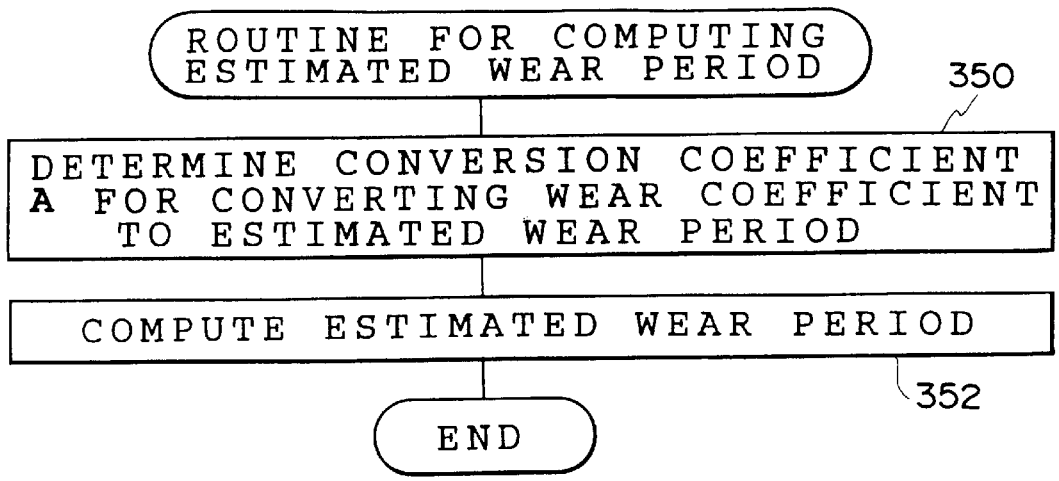
FIG. 9A shows a schematic flow chart exhibiting the procedures in a routine for computing a value of estimation in the third embodiment.

In step 350 shown in FIG. 9A, a conversion coefficient A for converting a wear coefficient to an estimated wear life is calculated by using, a measured value of the tire wear life Mj obtained in the actual use of the tire whose wear life is to be estimated and a wear coefficient MK which is obtained in accordance with formula (16) at the vehicle having the tire to be estimated attached thereto in, the following formula (21):

$$A = Mj/MK \tag{21}$$

In the next step 352, an estimated value of the tire wear life M is calculated by using the conversion coefficient A for converting a wear coefficient to an estimated wear life obtained above in the following formula (22):

$$M = MK \times A \quad (22)$$

and the present procedures are completed.

Figure 10:
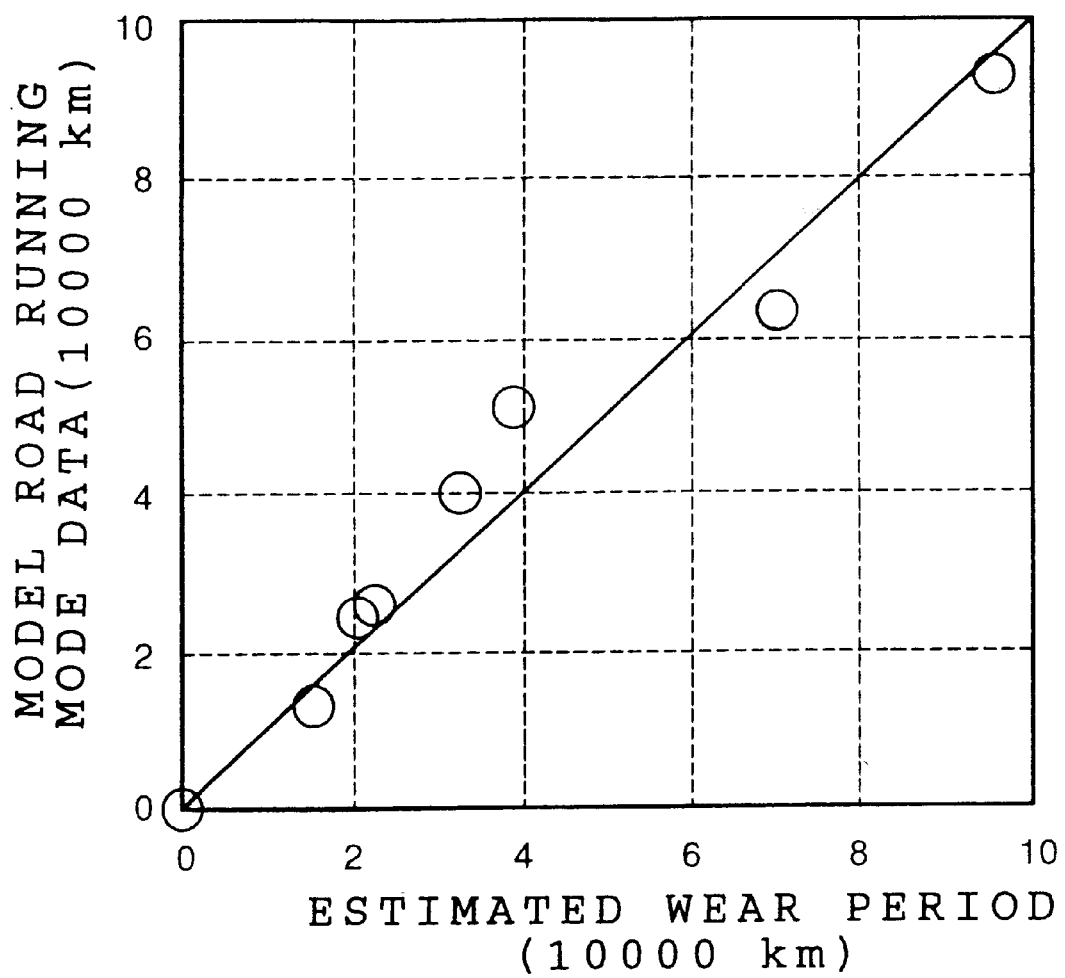
FIG. 10 shows a graph exhibiting the relation between the expected value of the tire wear life in the third embodiment and the amount of wear of a tire actually recorded in an actual use of vehicle.

FIG. 10 shows a graph exhibiting the relation between the expected value of the tire wear life obtained in accordance with the above procedures and the amount of wear of a tire fitted to a vehicle observed in actual use. As shown in the figure, the correlation between the estimated value of the tire wear life and the value obtained in actual use is excellent. Thus, the tire wear life can be estimated very accurately in accordance with the above procedures of the present embodiment.

In the present embodiment, the tire wear life is estimated in accordance with the routine for computing the estimated value of tire wear life shown in FIG. 9A. However, the tire wear life may also be estimated in accordance with the routine for computing the estimated value of tire wear life shown in FIG. 9B.

Figure 9B:
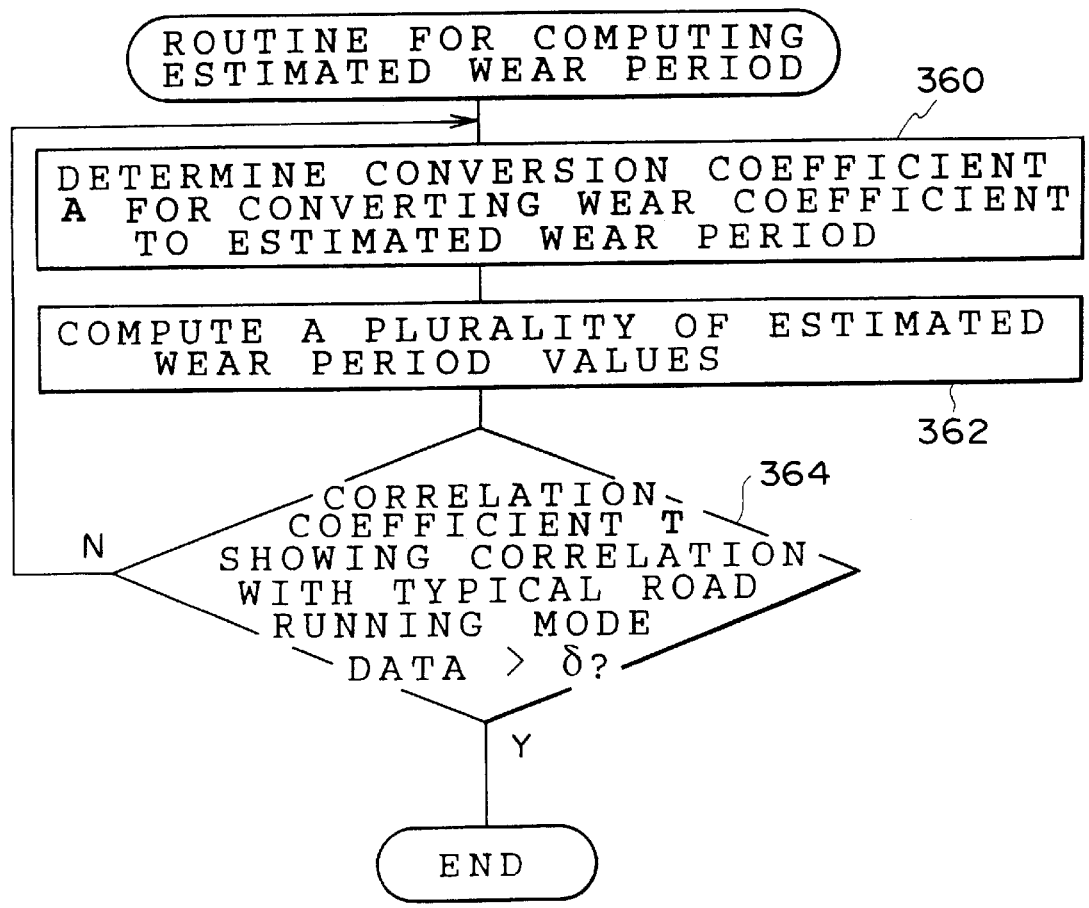
FIG. 9B shows a schematic flow chart exhibiting other procedures in a routine for computing a value of estimation in the third embodiment.

More specifically, in step 360 shown in FIG. 9B, a given value (1.0 in the present embodiment) is set as the initial value of the conversion coefficient A for converting a wear coefficient to an estimated wear life. In the next step 362, a plurality (3 or more) of estimated values of the tire wear life M are obtained by using the given initial value of the conversion coefficient A for converting a wear coefficient to an estimated wear life. In the next step 364, the correlation coefficient T between the plurality of estimated values of the tire wear life M obtained in step 362 and data obtained in the actual use of the tire is calculated.

The calculated correlation coefficient T is compared with a given threshold value δ (0.8 in the present embodiment). When the calculated correlation coefficient T is not greater than the given threshold value, the routine returns to step 360, the initial value of the conversion coefficient A is changed (increased or decreased) by a given value (0.1 in the present embodiment) and the procedures in step 362 and step 364 are carried out again.

In other words, the computation of the tire wear life M is repeated until the correlation coefficient T becomes greater than the threshold value δ and then the present routine for computing the value of estimated wear period is completed. As a result, the value of conversion coefficient A is eventually set in a manner such that the correlation coefficient between the estimated value of the tire wear life obtained by the computation and the data obtained in the actual use is greater than a given threshold value. Therefore, the tire wear life can be estimated more accurately.

As described above in detail, in accordance with the method for estimating the tire wear life of the present embodiment, the friction energy Ew is calculated by taking into consideration the toe angle, the camber angle and the load per one tire in the static condition and those in the dynamic condition of the vehicle to which the tire for estimation is fitted so that the input forces in actual use are reflected in the friction energy EW. As a result, the tire wear life can be estimated accurately.

In the above embodiments, the apparatus 10 for measuring the values of parameters required for computation of the friction energies generated at the road-contacting portion of a tire tread (shown in FIG. 5) described in the specification of JP-A 7-63658 is used for obtaining the friction energies. However, the present invention is not limited to this case.

For example, the Tire Pressure and Slip Plate, an apparatus for measuring the road-contacting pressure and amount of displacement manufactured by PRECISION MEASUREMENT Co., U.S.A., may be used. This apparatus is used for measurement of the friction energy in "A trial on laboratory evaluation of tire wear" by YOKOHAMA RUBBER Co., Ltd. reported in the preprint for the fall lecture meeting of the Japanese Automotive Engineers Society in 1982.

In the present embodiment, the groove depth NSD is obtained as the average of a plurality of groove depths in the tire tread portion. However, the present invention is not limited to this case. For example, the minimum value among a plurality of the groove depths may be used as the groove depth.

What is claimed is:

1. A method for estimating a tire wear life which comprises:

a step of obtaining a friction energy of the tire Ewf in a state in which the tire is free rolling, a friction energy of the tire Ewa in a state in which the tire is free rolling and set at an initial toe angle, a friction energy of the tire Ews in a state in which a side force is applied to the tire, a friction energy of the tire Ewd in a state in which a driving force is applied to the tire, and a friction energy of the tire Ewb in a state in which a braking force is applied to the tire;

a step of obtaining a wear resistance index G1 of rubber of a tire tread portion;

a step of obtaining a friction energy Ew expressed by a total of the friction energies Ewf, Ewa, Ews, Ewd and Ewb; and a step of estimating the tire wear life on the basis of a product of the wear resistance index G1 and a reciprocal of the friction energy Ew (1/Ew), i.e., G1×(1/Ew).

2. A method for estimating a tire wear life according to claim 1, wherein the friction energy Ew is calculated by taking data of a vehicle to which the tire wear life is to be estimated is taken into consideration, the data of the vehicle comprising: a toe angle, a camber angle and a load per one tire under a static condition of the vehicle; and at least one of changes in the toe angle, the camber angle and the load per one tire due to change in a condition of the vehicle from the static condition to a dynamic condition and the toe angle, the camber angle and the load per one tire under the dynamic condition of the vehicle.

3. A method for estimating a tire wear life according to claim 1, wherein the tire wear life is estimated on the basis of a value obtained by multiplying the product G1×(1/Ew) by a residual groove depth remaining before the groove depth reaches a limit for disposal of the tire.

4. A method for estimating a tire wear life according to claim 2, wherein the tire wear life is estimated on the basis of a value obtained by multiplying the product G1×(1/Ew) by a residual groove depth remaining before the groove depth reaches a limit for disposal of the tire.

5. A method for estimating a tire wear life according to claim 1, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of determining the undetermined coefficients S, D and B and the exponents ns, nd and nb in advance on the basis of values of the friction energy Ews, the friction energy Ewd and the friction energy Ewb measured under application of a given value of the input force in the transverse direction Fy, a given value of the force in the forward direction Fx+ and a given value of the force in the backward direction Fx−, respectively;

a step of determining values of the input force in the transverse direction Fy, the force in the forward direction Fx+ and the force in the backward direction Fx− on the basis of RMS values of a distribution of acceleration in a transverse direction at a center of gravity position of a vehicle and an distribution of acceleration in a longitudinal direction at a center of gravity position of the vehicle in the actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

6. A method for estimating a tire wear life according to claim 3, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of determining the undetermined coefficients S, D and B and the exponents ns, nd and nb in advance on the basis of values of the friction energy Ews, the friction energy Ewd and the friction energy Ewb measured under application of a given value of the input force in the transverse direction Fy, a given value of the force in the forward direction Fx+ and a given value of the force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

7. A method for estimating a tire wear life according to claim 1, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of setting each of the exponents ns, nd and nb at a value of 2 and determining the undetermined coefficients S, D and B in advance on the basis of values of the friction energy Ews, the friction energy Ewd and the friction energy Ewb measured under application of an input force in the transverse direction Fy, a force in the forward direction Fx+ and a force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

8. A method for estimating a tire wear life according to claim 3, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx+ generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of setting each of the exponents ns, nd and nb at a value of 2 and determining the undetermined coefficients S, D and B in advance on the basis of values of the friction energy Ews, the friction energy Ewd and the friction energy Ewb measured under application of an input force in the transverse direction Fy, a force in the forward direction Fx+ and a force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

9. A method for estimating a tire wear life according to claim 2, which further comprises a step of inputting data of an individual tire, the date including:

a wear resistance index G1 at a standard temperature of an atmosphere of a rubber sample made of the same material as the material of the tire tread portion of the tire whose tire wear life is to be estimated; an effective groove depth Z; parameters relating to the tire in free rolling; parameters relating to the tire under application of a side force; parameters relating to the tire under application of a braking force; and parameters relating to the tire under application of a driving force.

10. A method for estimating a tire wear life according to claim 4, which further comprises a step of inputting data of an individual tire which comprises:

a wear resistance index G1 at a standard temperature of an atmosphere of a rubber sample made of the same material as the material of the tire tread portion of the tire whose wear life is to be estimated; an effective groove depth Z; parameters relating to the tire in free rolling; parameters relating to the tire under application of a side force; parameters relating to the tire under application of a braking force; and parameters relating to the tire under application of a driving force.

11. A method for estimating a tire wear life according to claim 9, wherein the parameters relating to the tire in free rolling comprise:

a friction energy of the tire in free rolling ef, a friction energy of the tire in free rolling when the tire is provided with an initial toe angle eaf; and a friction energy of the tire per camber angle in free rolling Kf, the parameters relating to the tire under application of a side force comprise:

a friction energy of the tire under application of the side force es;

a change in a friction energy of the tire under application of the side force which is obtained by taking into consideration a change in a cornering power (hereinafter referred to as Cp) due to roll steer and due to a change in a load, a change in the toe angle due to the change in Cp and a change in the camber under application of the side force due to the change in Cp eas; and a change in a friction energy of the tire per camber angle under application of the side force Ks, the parameters relating to the tire under application of a braking force comprise:

a friction energy of the tire under application of the braking force eb;

a change in a friction energy of the tire under application of the braking force which is obtained by taking into consideration a change in Cp due to steer by a force in a longitudinal direction and due to a change in a load and a change in the toe angle due to the change in Cp eab; and a change in a friction energy of the tire per camber angle under application of the braking force Kb, and the parameters relating to the tire under application of a driving force comprise:

a friction energy of the tire under application of the driving force ed;

a change in a friction energy of the tire under application of the driving force which is obtained by taking into consideration a change in Cp due to steer by a force in a longitudinal direction and due to a change in a load and a change in the toe angle due to the change in Cp ead; and a change in a friction energy of the tire per camber angle under application of the driving force Kd.

12. A method for estimating a tire wear life according to claim 10, wherein the parameters relating to the tire in free rolling comprise:

a friction energy of the tire in free rolling ef, a friction energy of the tire in free rolling when the tire is provided with an initial toe angle eaf; and a friction energy of the tire per camber angle in free rolling Kf, the parameters relating to the tire under application of a side force comprise:

a friction energy of the tire under application of the side force es;

a change in a friction energy of the tire under application of the side force which is obtained by taking into consideration a change in a cornering power (hereinafter referred to as Cp) due to roll steer and due to a change in a load, a change in the toe angle due to the change in Cp and a change in the camber under application of the side force due to the change in Cp eas; and a change in a friction energy of the tire per camber angle under application of the side force Ks, the parameters relating to the tire under application of a braking force comprise:

a friction energy of the tire under application of the braking force eb;

a change in a friction energy of the tire under application of the braking force which is obtained by taking into consideration a change in Cp due to steer by a force in a longitudinal direction and due to a change in a load and a change in the toe angle due to the change in Cp eab; and a change in a friction energy of the tire per camber angle under application of the braking force Kb, and the parameters relating to the tire under application of a driving force comprise:

a friction energy of the tire under application of the driving force ed;

a change in a friction energy of the tire under application of the driving force which is obtained by taking into consideration a change in Cp due to steer by a force in a longitudinal direction and due to a change in a load and a change in the toe angle due to the change in Cp ead; and a change in a friction energy of the tire per camber angle under application of the driving force Kd.

13. A method for estimating a tire wear life according to claim 11, which further comprises:

a step of calculating a friction energy Ew as a total friction energy by using the data which have been input in the step of inputting data of the individual tire in the following formula (15):

$$Ew = \sum_{i=1}^{n} (Ewfi + Ewsi + Ewbi + Ewdi) \quad (15)$$

wherein n represents a number of the values of acceleration G taken as samples to obtain an distribution of acceleration in actual use of a vehicle, Ewfi represents a friction energy of the tire in free rolling obtained in accordance with the following formula (17), Ewsi represents a friction energy of the tire under application of a side force obtained in accordance with the following formula (18), Ewbi represents a friction energy of the tire under application of a braking force obtained in accordance with the following formula (19) and Ewdi represents a friction energy of the tire under application of a driving force obtained in accordance with the following formula (20):

$Ewfi=\{(ef+eaf) \times CA \times Kf\} \times \text{frequency } i$ (17)

$Ewsi=\{(es+eas) \times CA \times Ks\} \times \text{frequency } i$ (18)

$Ewbi=\{(eb+eab) \times CA \times Kb\} \times \text{frequency } i$ (19)

$Ewdi=\{(ed+ead) \times CA \times Kd\} \times \text{frequency } i$ (20)

wherein the frequency i represents a fraction of a frequency of an i-th acceleration in entire frequencies in the distribution of acceleration in the actual use of the vehicle and CA represents an initial value of a static camber angle; and a step of calculating a wear coefficient MK by using the friction energy Ew calculated above, the wear resistance index G1 and the effective groove depth Z in the following formula (16):

$MK=G1/Ew \times Z$ (16)

wherein the effective groove depth Z means a residual groove depth remaining before the groove depth reaches a value for disposal of the tire.

14. A method for estimating a tire wear life according to claim 12, which further comprises:

a step of calculating a friction energy Ew as a total friction energy by using the data which have been input in the step of inputting data of the individual tire in the following formula (15):

$$Ew = \sum_{i=1}^{n} (Ewfi + Ewsi + Ewbi + Ewdi) \quad (15)$$

wherein n represents a number of the values of acceleration G taken as samples to obtain a distribution of acceleration in actual use of a vehicle, Ewfi represents a friction energy of the tire in free rolling obtained in accordance with the following formula (17), Ewsi represents a friction energy of the tire under application of a side force obtained in accordance with the following formula (18), Ewbi represents a friction energy of the tire under application of a braking force obtained in accordance with the following formula (19) and Ewdi represents a friction energy of the tire under application of a driving force obtained in accordance with the following formula (20):

$Ewfi=\{(ef+eaf) \times CA \times Kf\} \times \text{frequency } i$ (17)

$Ewsi=\{(es+eas) \times CA \times Ks\} \times \text{frequency } i$ (18)

$Ewbi=\{(eb+eab) \times CA \times Kb\} \times \text{frequency } i$ (19)

$Ewdi=\{(ed+ead) \times CA \times Kd\} \times \text{frequency } i$ (20)

wherein the frequency i represents a fraction of a frequency of an i-th acceleration in entire frequencies in the distribution of acceleration in the actual use of the vehicle and CA represents an initial value of a static camber angle; and a step of calculating a wear coefficient MK by using the friction energy Ew calculated above, the wear resistance index G1 and the effective groove depth Z in the following formula (16):

$MK=G1/Ew \times Z$ (16)

wherein the effective groove depth Z means a residual groove depth remaining before the groove depth reaches a value for disposal of the tire.

15. A method for estimating a tire wear life according to claim 2, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$Ews = S \times Fy^{ns}$ $Ewd = D \times Fx+^{nd}$ $Ewb = B \times FX-^{nb}$ a step of determining the undetermined coefficients S, D and B and the exponents ns, nd and nb in advance on the basis of values of the friction energy Ews, the friction energy Ewd and the friction energy Ewb measured under application of a given value of the input force in the transverse direction Fy, a given value of the force in the forward direction Fx+ and a given value of the force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

16. A method for estimating a tire wear life according to claim 4, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of determining the undetermined coefficients S, D and B and the exponents ns, nd and nb in advance on the basis of values of the friction energy Ews, the friction energy Ewd and the friction energy Ewb measured under application of a given value of the input force in the transverse direction Fy, a given value of the force in the forward direction Fx+ and a given value of the force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

17. A method for estimating a tire wear life according to claim 2, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of setting each of the exponents ns, nd and nb at a value of 2 and determining the undetermined coefficients S, D and B in advance on the basis of values of the friction energy Ews, the friction energy Ewd and the friction energy Ewb measured under application of an input force in the transverse direction Fy, a force in the forward direction Fx+ and a force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

18. A method for estimating a tire wear life according to claim 4, which further comprises:

a step of expressing the friction energy Ews, the friction energy Ewd and the friction energy Ewb, using an input force in a transverse direction Fy, a force in a forward direction Fx+ generated by the driving force, a force in a backward direction Fx− generated by the braking force, undetermined coefficients S, D and B and exponents ns, nd and nb, by the following formulae:

$$Ews = S \times Fy^{ns}$$

$$Ewd = D \times Fx+^{nd}$$

$$Ewb = B \times FX-^{nb}$$

a step of setting each of the exponents ns, nd and nb at a value of 2 and determining the undetermined coefficients S, D and B in advance on the basis of values of the friction energy Ews, the friction energy Ewd and the friction energy Ewb measured under application of an input force in the transverse direction Fy, a force in the forward direction Fx+ and a force in the backward direction Fx−, respectively;

a step of determining values of the input force in the transverse direction Fy, the force in the forward direction Fx+ and the force in the backward direction Fx− on the basis of RMS values of an distribution of acceleration in a transverse direction at a center of gravity position of a vehicle and an distribution of acceleration in a longitudinal direction at a center of gravity position of the vehicle in actual use of the vehicle; and a step of obtaining the friction energy Ews, the friction energy Ewd and the friction energy Ewb on the basis of the determined values of the input force in the transverse direction Fy, the force in the forward direction Fx+ and the force in the backward direction Fx− in accordance with the above formulae in which the coefficients and the exponents have been determined.

19. A method for estimating a tire wear life according to claim 13, which further comprises a step of carrying out a routine for computing a estimated value of wear life, said step comprising:

a step of calculating a conversion coefficient A for converting a wear coefficient to an estimated wear life by using an actually measured value of the tire wear life Mj obtained in actual conditions in use to which the estimation is to be applied and a wear coefficient MK obtained at a vehicle having a tire to be estimated fitted thereto obtained by formula (16), in the following formula (21):

$$A = Mj/MK \tag{21}$$

and a step of calculating a value of estimated the tire wear life M in accordance with the following formula (22):

$$M = MK \times A \tag{22}$$

20. A method for estimating a tire wear life according to claim 14, which further comprises a step of carrying out a routine for computing a estimated value of wear life, said step comprising:

a step of calculating a conversion coefficient A for converting a wear coefficient to an estimated wear life by using an actually measured value of the tire wear life Mj obtained in actual conditions in use to which the estimation is to be applied and a wear coefficient MK obtained a vehicle having a tire to be estimated fitted thereto obtained by formula (16), in the following formula (21):

$$A = Mj/MK \quad (21)$$

and a step of calculating a value of estimated the tire wear life M in accordance with the following formula (22):

$$M = MK \times A \quad (22).$$

21. A method for estimating a tire wear life according to claim 19, which further comprises:

a step of setting a given value as an initial value of the conversion coefficient A for converting a wear coefficient to an estimated wear life;

a step of obtaining a plurality (3 or more) of values of estimated tire wear life M by using the initial value of the conversion coefficient A for converting a wear coefficient to an estimated wear life;

a step of calculating a correlation coefficient T between the obtained plurality of values of estimated tire wear life M and data of actual wear life obtained in actual use of the tire;

a step of comparing the calculated correlation coefficient T with a given threshold value $\delta$; and when the calculated correlation coefficient T is not greater than the given threshold value, a step of changing the initial value of the conversion coefficient A by a given value and carrying out the step of obtaining a plurality of values of estimated tire wear life M by using the changed value of the conversion coefficient A and the step of calculating a correlation coefficient T.

22. A method for estimating a tire wear life according to claim 20, which further comprises:

a step of setting a given value as an initial value of the conversion coefficient A for converting a wear coefficient to an estimated wear life;

a step of obtaining a plurality (3 or more) of values of estimated the tire wear life M by using the initial value of the conversion coefficient A for converting a wear coefficient to an estimated wear life;

a step of calculating a correlation coefficient T between the obtained plurality of values of estimated tire wear life M and data of actual wear life obtained in actual use of the tire;

a step of comparing the calculated correlation coefficient T with a given threshold value $\delta$; and when the calculated correlation coefficient T is not greater than the given threshold value, a step of changing the initial value of the conversion coefficient A by a given value and carrying out the step of obtaining a plurality of values of estimated tire wear life M by using the changed value of the conversion coefficient A and the step of calculating a correlation coefficient T.

* * * * *

UNITED STATES PATENT AND TRADEMARK OFFICE
CERTIFICATE OF CORRECTION

PATENT NO. : 6,212,947 B1
DATED : April 10, 2001
INVENTOR(S) : Akiyoshi Shimizu et al.

It is certified that error appears in the above-identified patent and that said Letters Patent is hereby corrected as shown below:

Title page,
References Cited,
Line 56, change "4,779,477" to -- 4,779,447 --.

Signed and Sealed this

Eighth Day of January, 2002

Attest:

JAMES E. ROGAN
Attesting Officer     Director of the United States Patent and Trademark Office